United States Patent [19]

Favre

[11] 4,298,807

[45] Nov. 3, 1981

[54] PROCESS FOR INSPECTING THE PHYSICAL STATE OF A PRINTED DOCUMENT AND AN INSTALLATION FOR PUTTING THE PROCESS INTO OPERATION

[75] Inventor: Nicolas Favre, Cornaux, Switzerland

[73] Assignee: Compagnie Industrielle Radioelectrique, Switzerland

[21] Appl. No.: 98,332

[22] Filed: Nov. 27, 1979

[30] Foreign Application Priority Data

Dec. 1, 1978 [CH] Switzerland ........................ 12290/78

[51] Int. Cl.[3] ........................................... G01N 21/88

[52] U.S. Cl. ..................................... 250/562; 356/430

[58] Field of Search ............... 250/560, 562, 563, 569, 250/571, 572, 578; 356/445-447, 429-431, 71

[56] References Cited

U.S. PATENT DOCUMENTS 3,800,148 3/1974 De Cock ............................ 250/562

3,986,037 10/1976 Faulhaber ........................... 250/562

4,237,539 12/1980 Piovoso et al. ..................... 356/430

*Primary Examiner*—David C. Nelms

*Attorney, Agent, or Firm*—Robert E. Burns; Emmanuel J. Lobato; Bruce L. Adams

[57] ABSTRACT

Documents are caused to pass in front of a light source incorporating optical fibres and the reflected light is collected by means of photoelectric elements. The collected reflected light is compared with a reference value. A row of photoelectric elements is used which successively transmits, by multiplexing, the signals delivered simultaneously by a row of the photoelectric elements. The analog signals are converted into digital signals, and a totalling and averaging of the digital signals is carried out in order to determine the state of general dirtiness of the document. The number of photoelectric elements of the row covered by the document is counted to inspect the width of the document and detect the presence of dog ears. In addition the number of photoelectric elements delivering a signal which exceeds a certain level is counted. Finally each digital signal corresponding to a point of the document is compared with a reference value in order to determine the presence of a hole, a stain or similar condition. The comparisons and tests are carried out by processing logic. The installation includes means for virtually displacing the reading head taking into account the real lateral displacement of the document in relation to the row of diodes.

5 Claims, 12 Drawing Figures

28
25
26
32

| | M1 | M2 | M3 | M4 | M5 | M6 | M7 | M8 | M9 | M10 | |
|---|---|---|---|---|---|---|---|---|---|---|---|
| C1 | Q10 | Q1 | Q2 | Q3 | Q4 | Q5 | Q6 | Q7 | Q8 | Q9 | D1L, D2L, D3L, D4L |
| C2 | Q9 | Q10 | Q1 | Q2 | Q3 | Q4 | Q5 | Q6 | Q7 | Q8 | D2L, D3L, D4L |
| C3 | Q8 | Q9 | Q10 | Q1 | Q2 | Q3 | Q4 | Q5 | Q6 | Q7 | D3L, D4L |
| C4 | Q7 | Q8 | Q9 | Q10 | Q1 | Q2 | Q3 | Q4 | Q5 | Q6 | D4L |

Fig. 4a

PROCESS FOR INSPECTING THE PHYSICAL STATE OF A PRINTED DOCUMENT AND AN INSTALLATION FOR PUTTING THE PROCESS INTO OPERATION

The present invention relates to a process for inspecting the physical state of a printed document and an installation for putting the process into operation.

The present invention is concerned with a process for inspecting the physical state of a printed document, for example a bank note, in which the document is caused to pass in front of a source of light and the light reflected is collected by means of photoelectric elements, the collected reflected light being compared with a reference value.

A process of this type is described in Belgian patent No. 690,919. The process consists of individually comparing the signals received by photoelectric receivers with reference values corresponding to the surface of the document. This process requires a large number of photoelectric elements, reference values and comparison circuit values if it is desired to inspect the whole surface of the document. Moreover, the results of the comparisons do not give differentiated information concerning the general state of dirtiness, the presence of stains, holes, adhering paper, dog ears, or the size of the document.

An object of the present invention is to obtain by means of a limited number of photoelectric elements delivering non-differentiated signals, differentiated information relating to the general state of dirtiness, the presence of dark stains, holes, adhering paper, dog ears, the condition of the edges of the document and the dimensions of the document.

According to the present invention, there is provided a process for inspecting the physical state of a printed document wherein the document is caused to pass in front of a source of light and the light reflected is collected by means of photoelectric elements and compared with a reference value, characterised in that the document to be inspected is made to pass laterally with respect to a row of photoelectric elements, the signals delivered simultaneously by the row of photoelectric elements are successively transmitted by multiplexing, the analog signals delivered by the photoelectric elements are converted into digital signals, the digital signals are averaged in order to determine the general state of dirtiness of the document, the number of photoelectric elements of the row which are covered by the document are counted in order to determine the width of the document and to detect the presence of dog ears, the number of photoelectric elements delivering a signal which exceeds a certain level are counted to detect abnormal reflections, and each digital signal corresponding to a point of the document is compared with a reference value in order to determine the presence of a hole, a stain or a similar condition.

The invention also provides an installation for putting the above process into operation, characterised by a source of cold white light, a reading head consisting of a number n of photoelectric elements forming a row of length greater than the width of the widest document to be inspected, the number of elements being divided into several equal groups, an amplifier in respect of each of the photoelectric elements, a first multiplexing circuit associated with each group, an amplifier with automatic gain correction and an analog/digital converter associated with each multiplexing circuit, a circuit for counting and averaging in respect of each analog/digital converter, a second multiplexing circuit receiving simultaneously the signals of all the analog/digital converters, a circuit for counting the digital signals proceeding from all the photoelectric elements, a circuit for comparison of the digital signals corresponding to each photoelectric element with a reference value including several comparators, a circuit for counting the signals delivered by the comparators which are outside desired tolerances and a clock circuit controlled by a signal of frequency synchronous with the speed at which the documents to be inspected pass through.

The invention makes it possible to obtain differentiated information by means of which it is possible to eliminate documents considered as deteriorated according to different criteria which can be individually modified. It is, moreover, possible to use the information received for statistical purpose or with a view to remedying certain defects which are more frequent than others.

An installation embodying the invention will now be described, by way of example, with reference to the accompanying drawings, in which.

Figure 4:
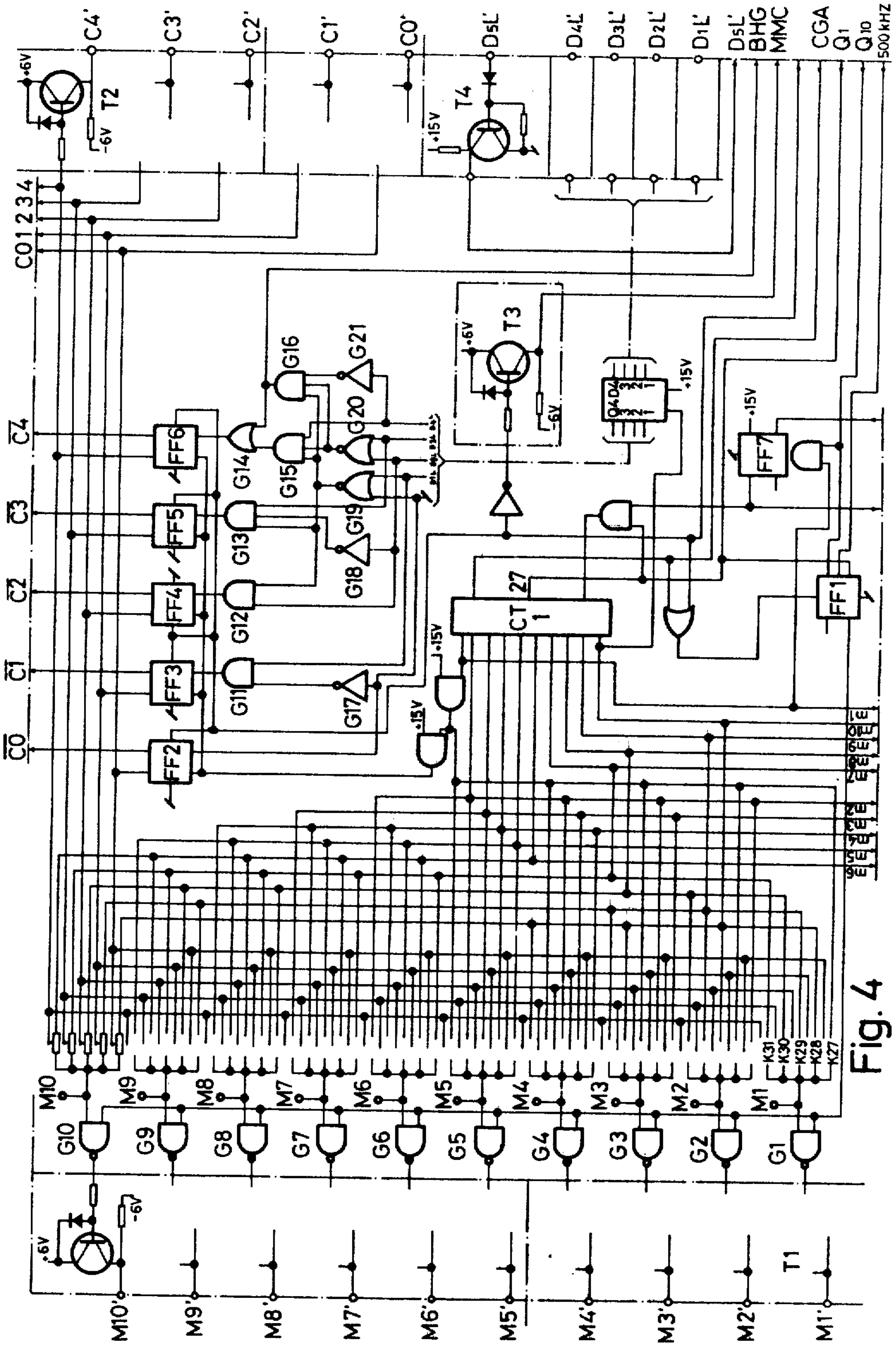
FIG. 4 shows the circuit of the multiplexing control circuit of FIG. 2.

FIG. **4*a* is a decoding table of the decoding circuit of FIG. 4** fo the control of the virtual displacement of the reading head.

Figure 2:
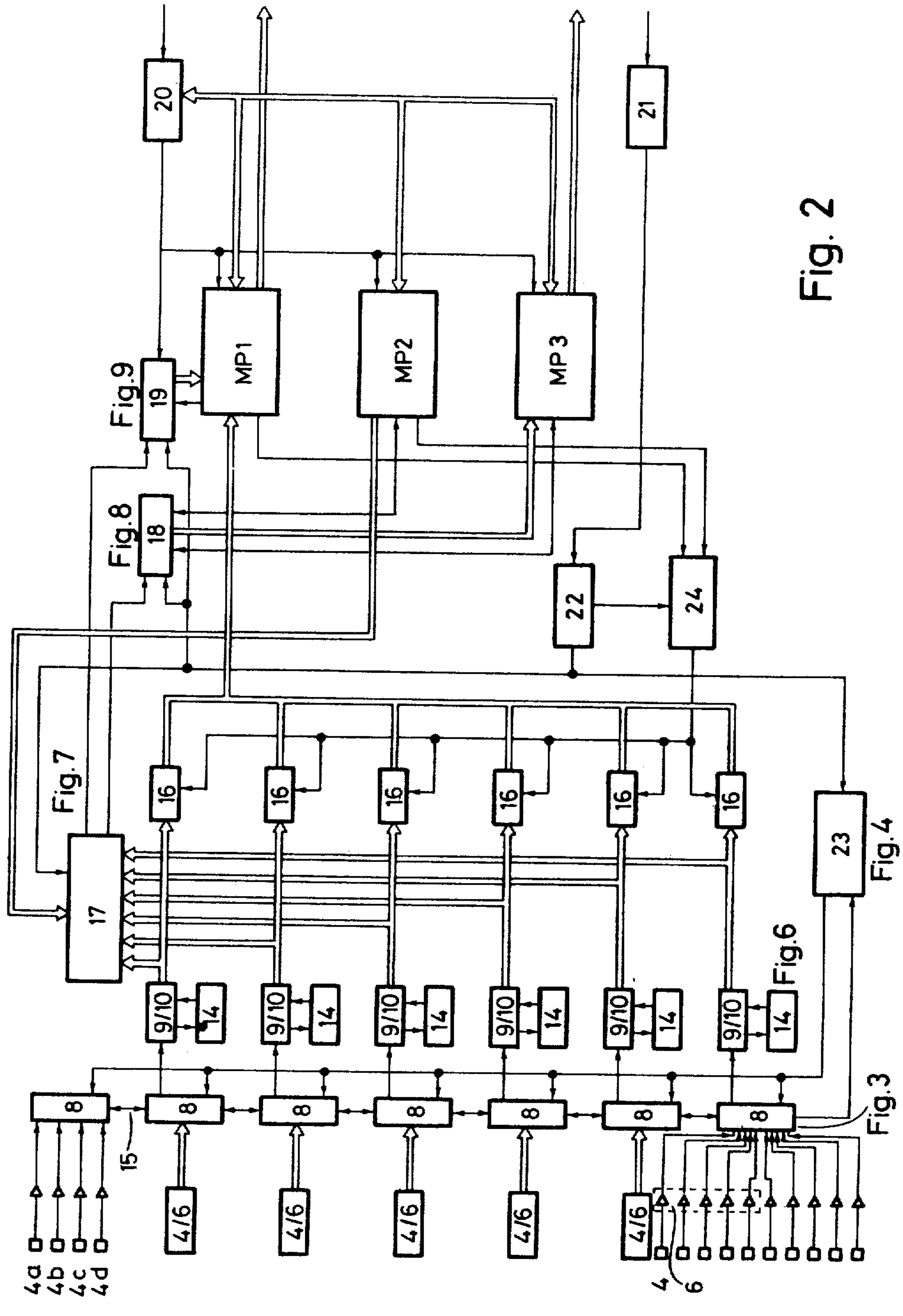
FIG. 2 is a detailed block diagram of the installation.
Figure 5:
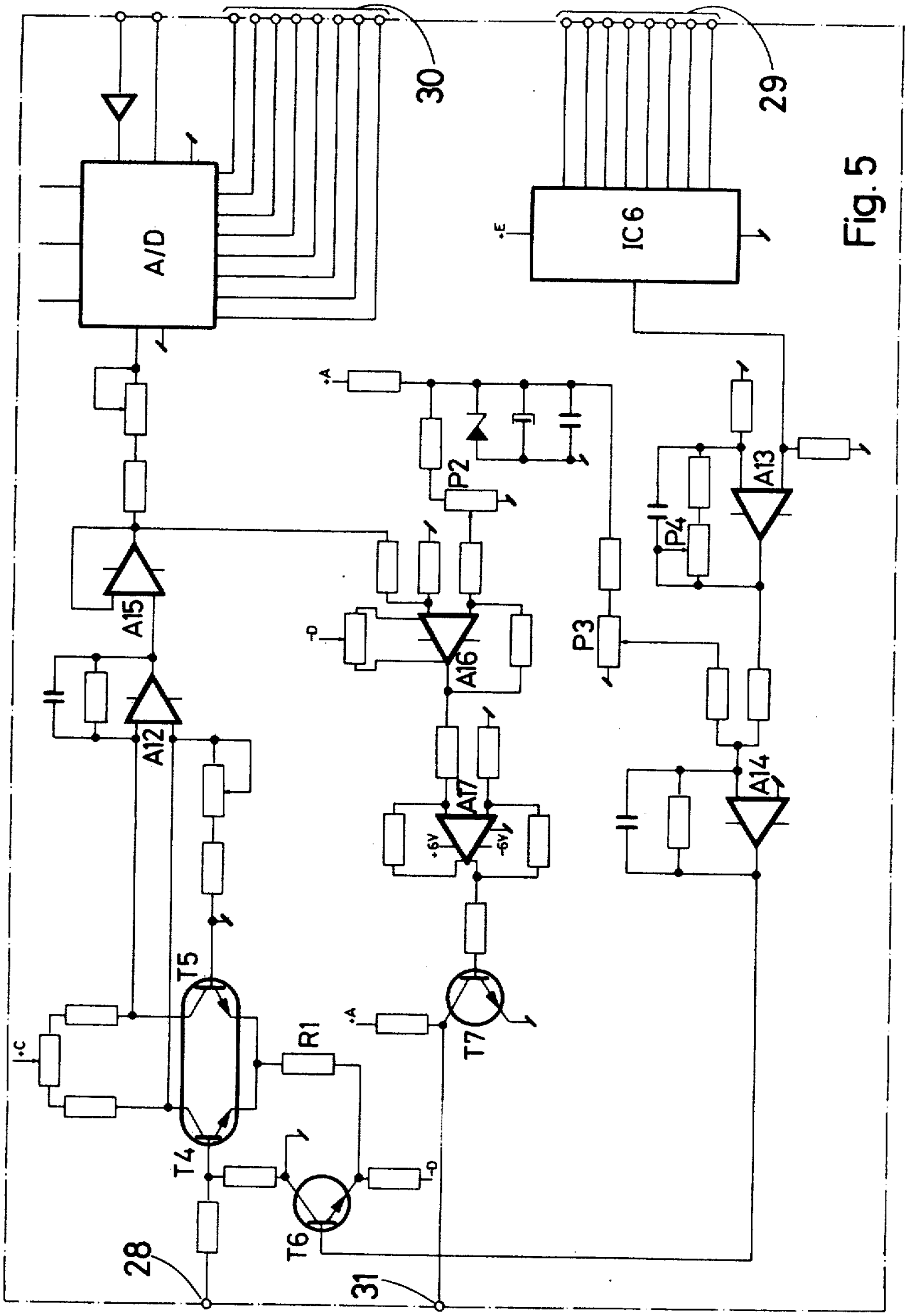
Figure 6:
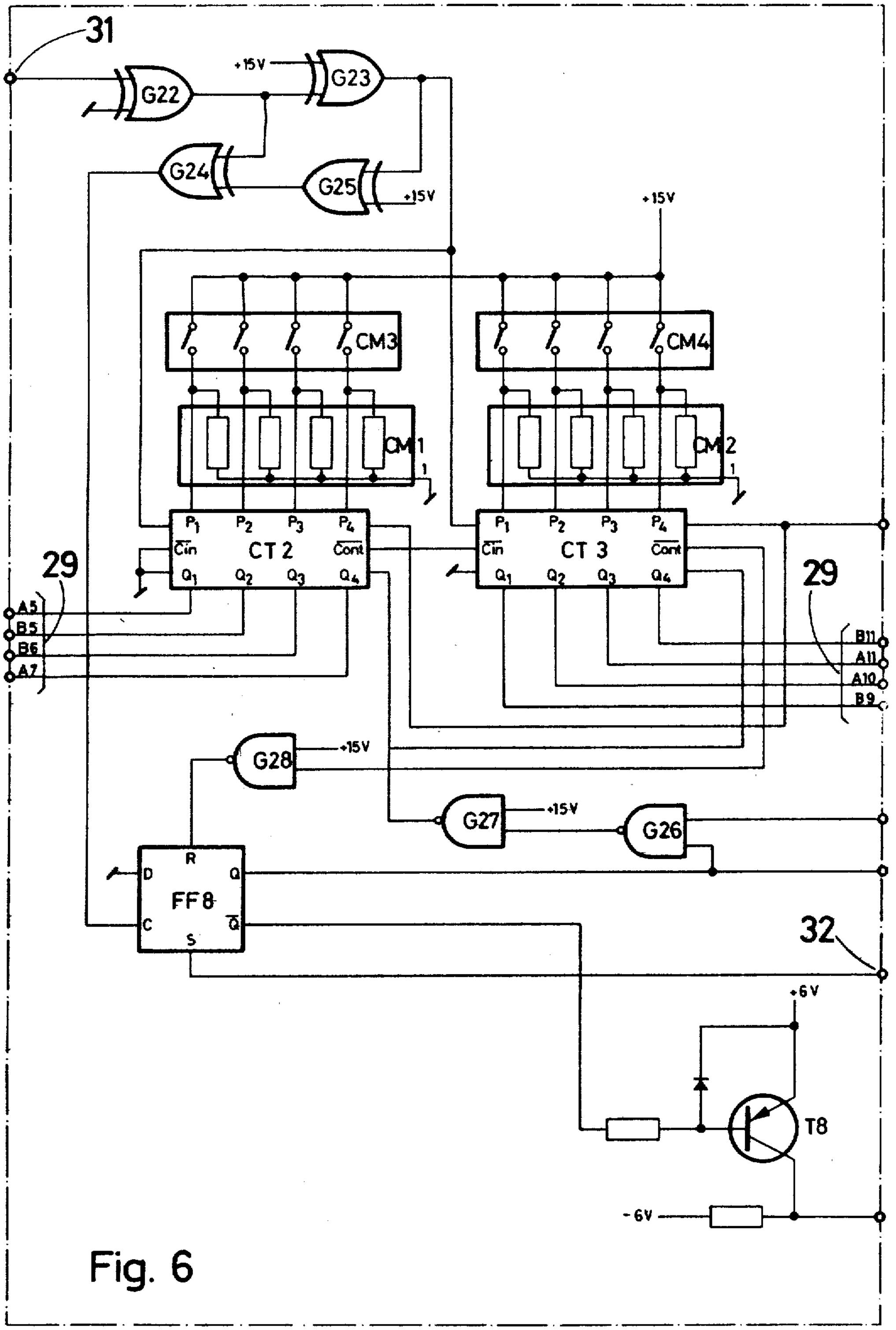
Figure 7:
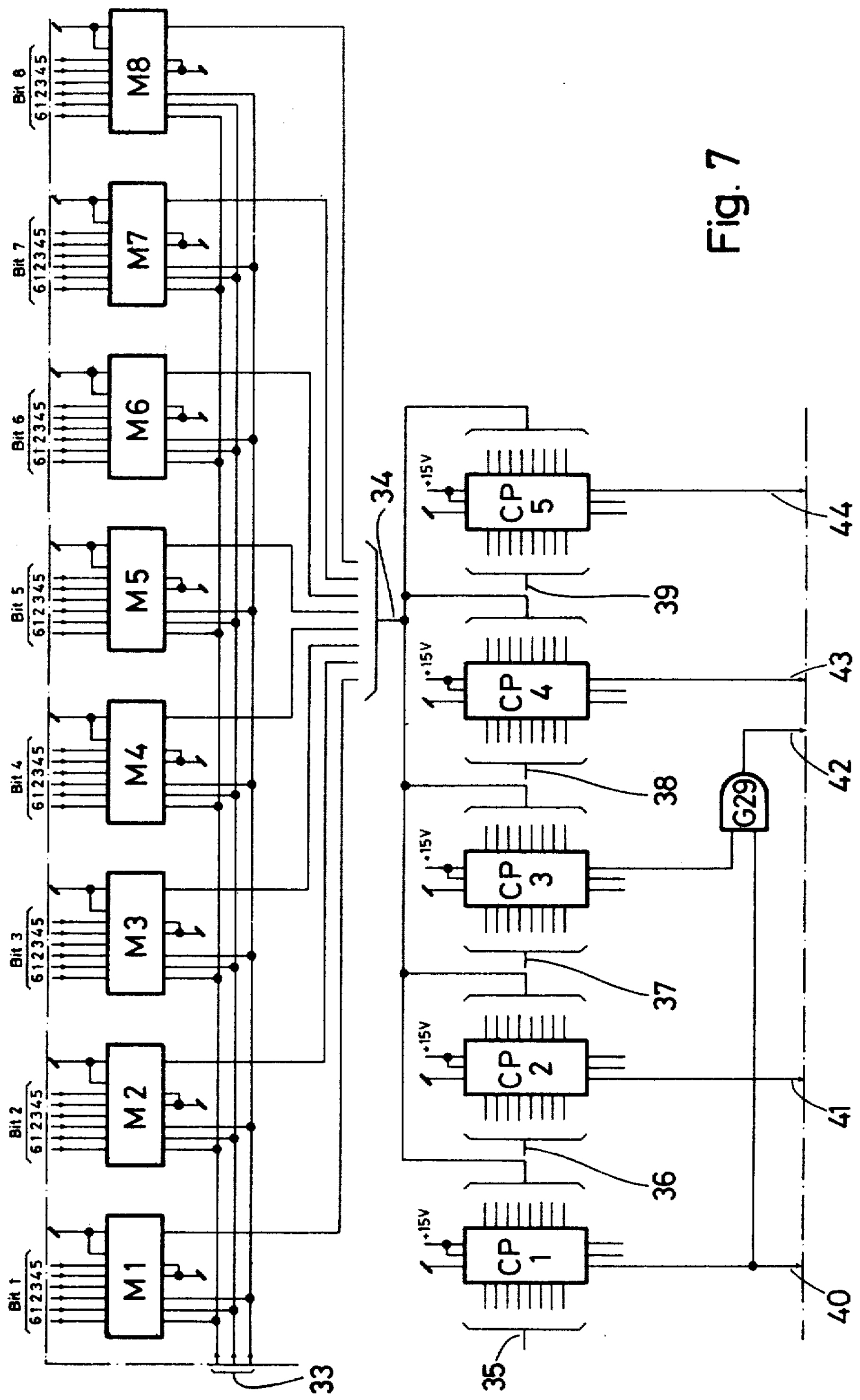
Figure 8:
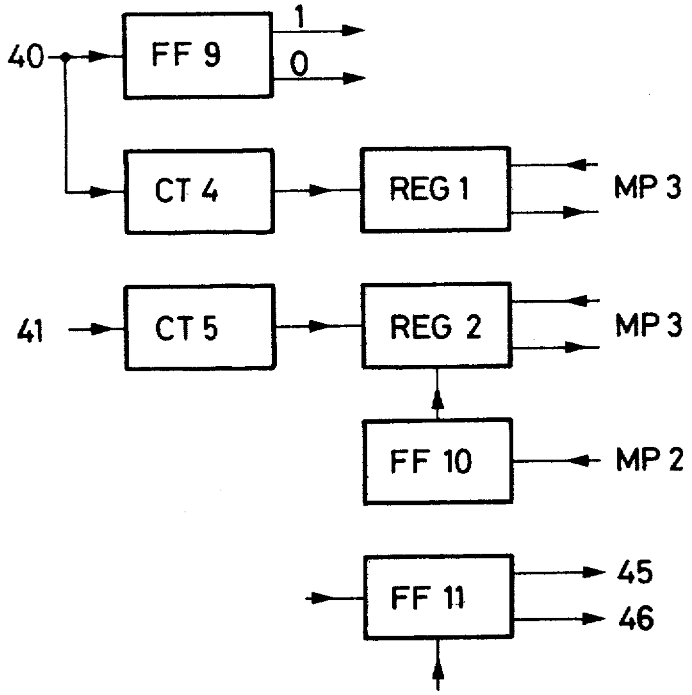
Figure 9:
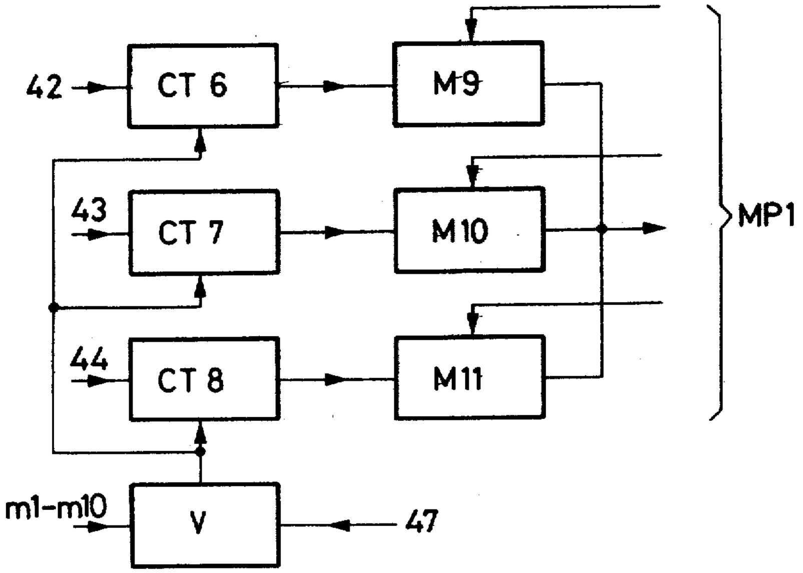
Figure 10:
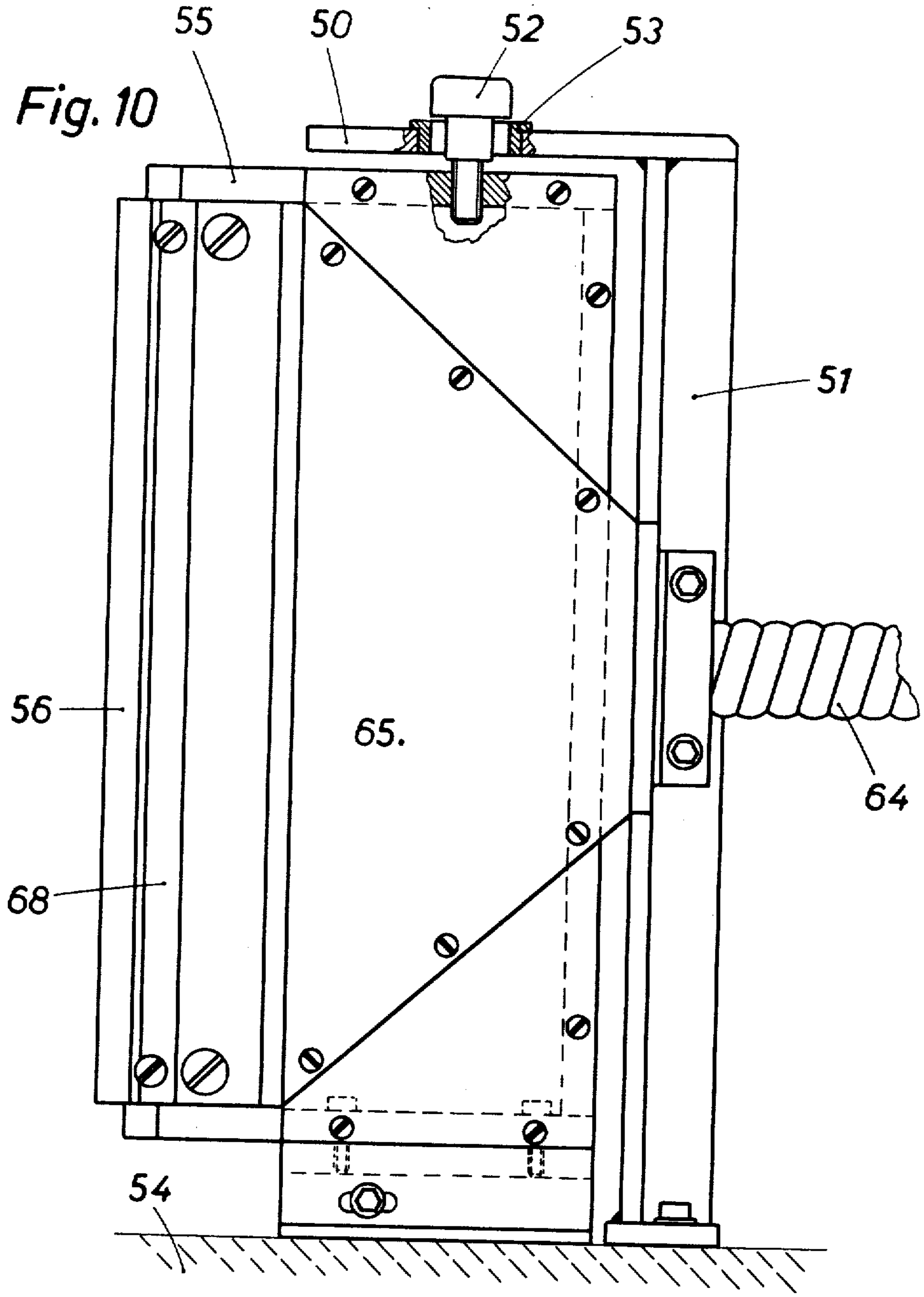

FIG. 5 shows the circuit of the amplifier with automatic gain control and of the analog/digital converter of FIG. 2;

FIG. 6 shows the circuit for control of the amplifier with automatic gain control of FIG. 2;

FIG. 7 shows the digital multiplexing circuit and the comparison circuit of FIG. 2;

FIG. 8 is a block diagram of the circuit for inspection of the dimensions of the document and the presence of adhering paper;

FIG. 9 is a block diagram of the circuit for counting of stains and holes;

FIG. 10 respresents a side view of the reading head; and

Figure 11:
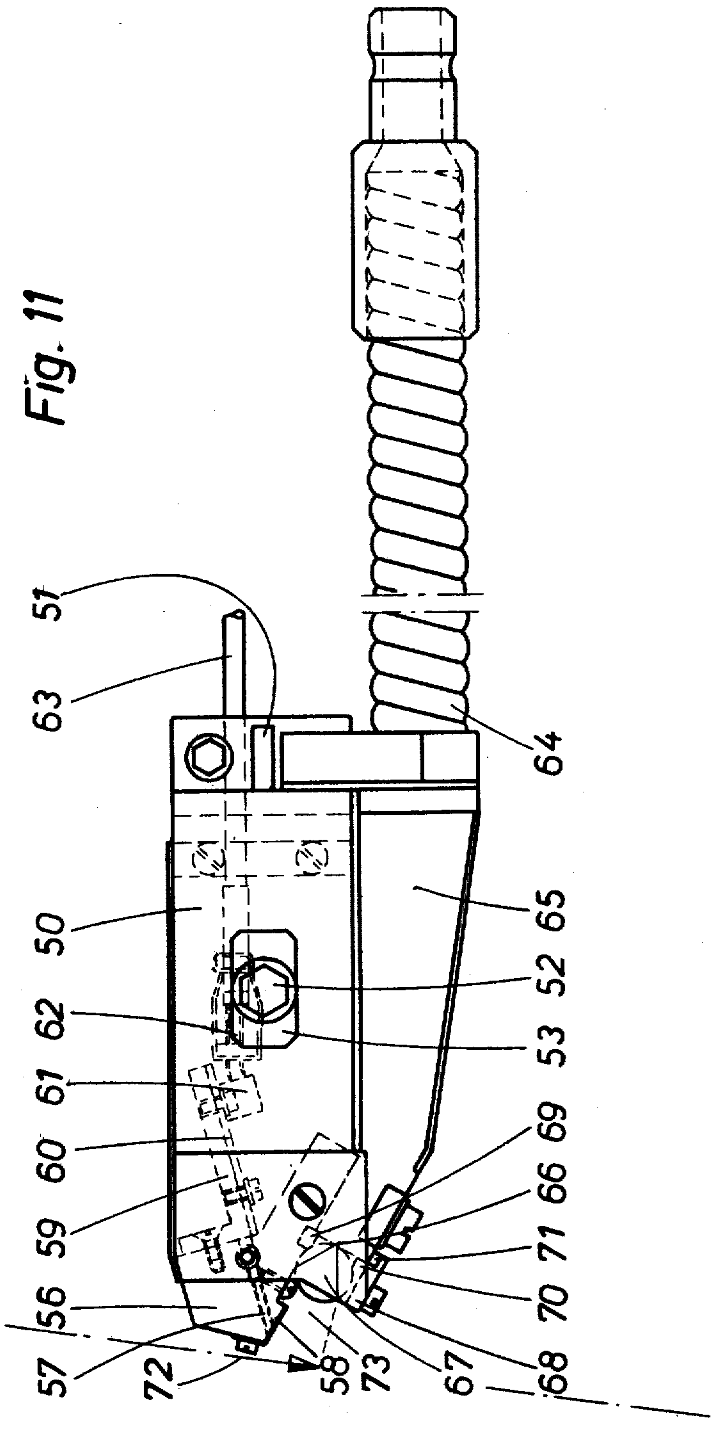

FIG. 11 represents a profile view of the reading head.

Figure 1:
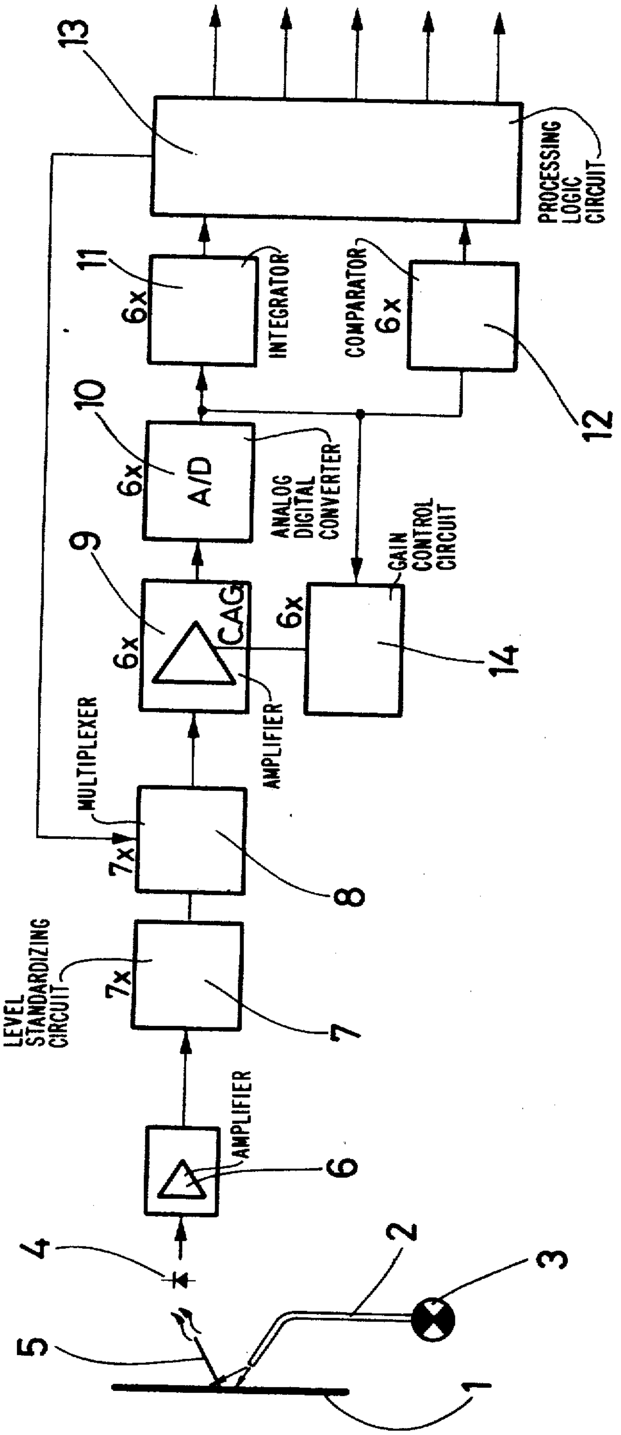
FIG. 1 is a simplified block diagram of the installation.

A process and installation according to the inventon will be briefly described first of all with reference to the simplified block diagram shown in FIG. 1. A document 1 to be inspected, for example a bank note, passes in front of a reading head consisting of light emitters in the form of optical fibres 2. The fibres 2 are supplied by a source of cold white light in the form of a halogen lamp 3. A row of sixty-four photodiodes 4 only one of which is shown receive light 5 reflected by the document 1.

The output signal of each photodiode 4 is amplified by an amplifier 6. The analog signals appearing at the outputs of the amplifiers 6 are applied to circuits 7 which standardise the level 0 of these signals. The outputs of circuits 7 are connected to multiplexing circuits 8 which successively supply the analog signals to amplifiers 9 the gain of which is automatically controlled. The amplified analog signals are transformed into digital signals by analog/digital converters 10. The resultant digital signals are supplied to circuits 11 and 12.

The circuits 11 sum the signals corresponding to all the points of the document for which the signal is received, whilst the circuits 12 process the signals individually and in groups in order to compare their level with a reference level. The circuit 11 thus makes it possible to determine the state of general dirtiness of the document, whilst the circuit 12 gives information which makes it possible to determine the presence of stains, holes, adhering paper, dog ears and the dimensions of the document.

The signals delivered by the circuits 11 and 12 are sent to a processing logic circuit 13 comprising microprocessors, which not only carry out analysis of the information received, but additionally monitor the sending of required information, e.g. sending information regarding reference values to the comparison circuits. By means of differentiated processing of the signals received the processing logic circuit 13 determines the condition of the document as far as its normal state of dirtiness is concerned, the presence of holes, adhering paper, stains, dog ears and damaged edges. The digital signals proceeding from the circuit 10 are moreover applied to circuits 14 which automatically control the gain of the amplifiers 9.

The block diagram seen in FIG. 2 illustrates the installation in a more detailed manner. Of the sixty four photodiodes 4, sixty photodiodes corresponding to the maximum width of the document to be inspected are distributed into six groups of ten in such a manner as to facilitate analog multiplexing. Only one of these groups has been completely represented with the corresponding amplifiers 6. The five other groups, with the corresponding amplifiers, are represented by the blocks 4/6. There remains a group of four photodiodes 4*a*, 4*b*, 4*c*, 4*d* which prolongs the row of diodes over a distance which is greater than the maximum width of the document to be inspected in such a manner as to take into account a lateral displacement of the document in relation to the row of photodiodes. Thus the document is situated in all cases in front of a number of diodes which correspond to its width.

Each group of photodiodes is associated with one of the circuits 8 for multiplexing and virtual positioning of the reading head 8. Provided that one takes into account a lateral displacement of the documents being inspected in order to determine which are the photodiodes covered by the documents, the distribution of the photodiodes is not as rigid as it seems at first glance. It is possible to have a displacement of the groups at the multiplexing level. This is indicated by the double arrows such as 15 between the multiplexing circuits 8. Each multiplexing circuit 8, with the exception of the circuit associated with the group of four diodes, supplies an automatic gain control (CAG) amplifier 9 and an analog/digital converter 10, the circuits 9 and 10 being indicated by the same unit 9/10. An automatic gain control circuit 14 is associated with each of these circuits 9/10.

Each analog/digital converter 10 delivers a digital signal of 8 bits which are applied to a respective averaging circuit 16 and to a common comparison circuit 17. The circuit 17 compares the signals received simultaneously from the six analog/digital converters 10 with reference values and successively supplies the results to a circuit 18 for inspecting the dimensions of the documents and for adhering paper, and to a circuit 19 for counting stains and holes. The averaging circuits 16 deliver words of fifteen bits which are sent to a first microprocessor system MP1. The same applies to words of 8 bits delivered by the stain and hole counting circuit 19. The microprocessor system MP1 uses these signals in order to determine the presence of holes, stains, serration, as well as the general state of dirtiness.

The circuit 18 for inspecting the dimensions of the document and for adhering paper 18 delivers words of eight bits which are sent to a microprocessing system MP3 which extracts from it information relating to the dimensions, the presence of dog ears and the presence of adhering paper.

The installation also comprises a third microprocessing system MP2 which supplies the multiplexing and comparison circuit 17 with signals representing the reference values with which the measured signals are to be compared and instructions concerning, for example, the particular zones of the document to be inspected. The installation also includes a multiplier 21 which multiplies a signal of frequency 10 KHz, which is synchronous with the passage of the documents, by fifty to obtain a signal of frequency 500 KHz. This 500 KHz signal is used to control a time base 22 which determines the working rhythm of the multiplexing circuit 17, and of a circuit 23 for the control of the analog multiplexing circuits 8 and the virtual positioning of the reading head. The time base also supplies a signal to a circuit 24 for controlling the averaging circuits 16. This circuit 24 is controlled by the microprocessing system MP1 and MP2.

The three microprocessing systems MP1, MP2 and MP3 are identical and each takes on a well defined task. Each of these systems is built by means of standardised modules which take on their own function. It takes the information which it requires, processes it and supplies the results in the form of a binary word. This technique is known in itself and will not be described here in detail. The utilisation of three microprocessors is made necessary by the working pressures in actual time which result from the great rapidity of passage of the documents which is 20 documents per second. Each microprocessing system has its own programme. Two main working cycles are distinguished, that is, the cycle in which the machine is in operation and the cycle in which the machine is waiting. The tasks of the first cycle are as follows: taking up of information, monitoring of all the parameters used, decision as to the condition of the documents, and submission of results. The tasks of the waiting cycle consist of the introduction of possible new reference values into the memories of the microprocessors. This is carried out by means of the input/output keyboard 20. The microprocessor systems have the function of comparing the data supplied by the reading head with reference values stored in the memory and drawing from them conclusions as to the physical state of the document. The decisions supplied by the microprocessing systems are used to control the devices for ejection of documents considered as unacceptable. The great flexibility of the microprocessors makes it possible to inspect zones of a document as a function of the nature of the document and the zones which it is especially suitable to inspect in order to determine for example whether a document is authentic or false or to distinguish between the presence of an acceptable stain in a certain zone whilst it is unacceptable in a different zone. As a further example, as far as the presence of adhering paper is concerned, the microprocessing system MP3 makes it possible to determine the importance of the adhering paper, its situation, height and width on the document.

Figure 3:
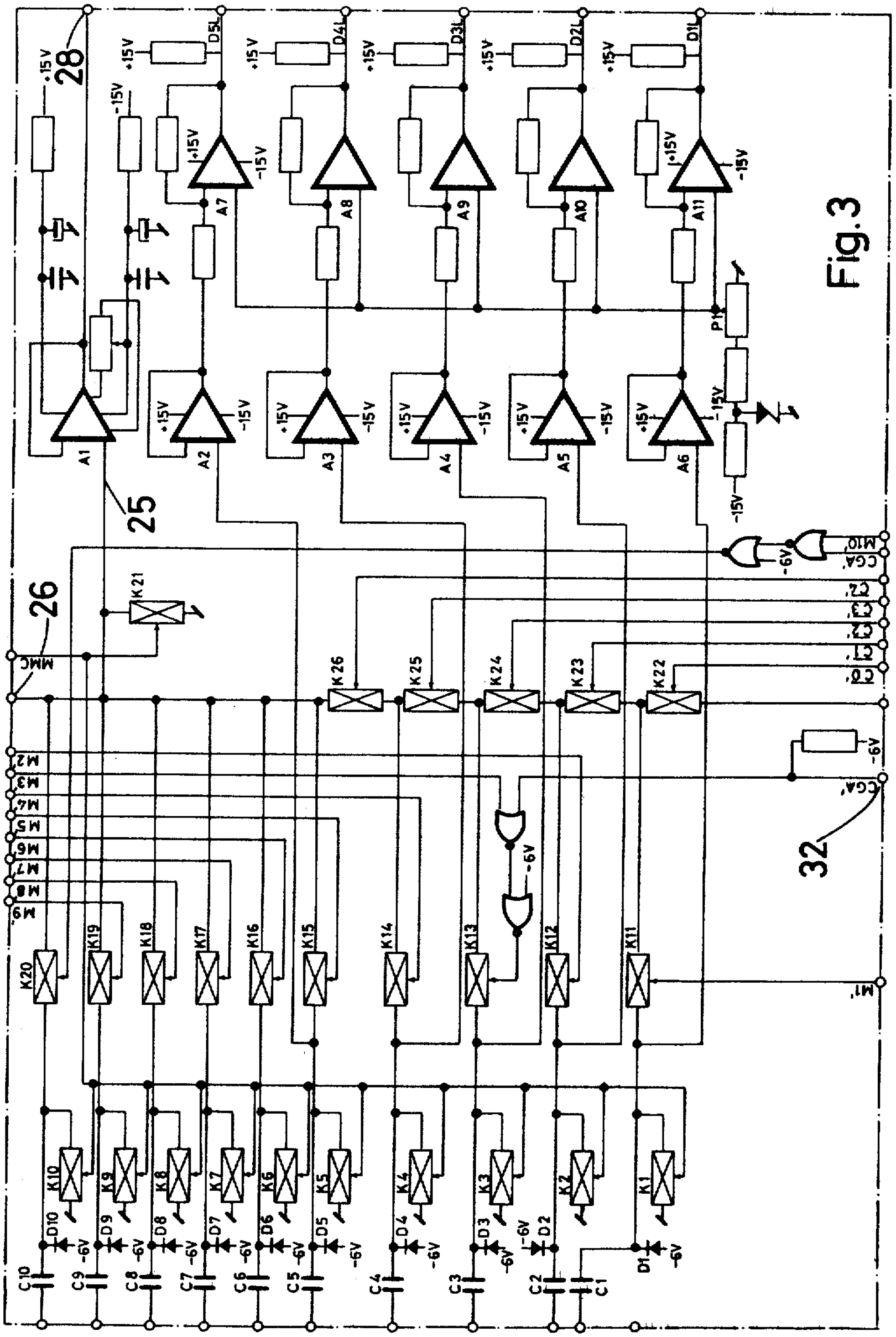
FIG. 3 shows the circuit of the analog multiplexing network of FIG. 2.

One of the circuits 8 for analog multiplexing and virtual positioning of the reading head is shown in FIG. 3. This circuit has two main functions, that is the multiplexing of ten signals supplied simultaneously by ten amplifiers 6 into a succession of signals sent on the same line to the amplifier 9, and calibration by offsetting the photodiode output signals by a constant amount such that a signal which corresponds to a minimum luminosity has the amplitude 0 volts. The coupling between the amplifiers 6 and the multiplexing circuit is achieved by means of ten capacitors C1 to C10 with a value of 1 $\mu$F. One of the terminals of each capacitor is connected by a respective one of diodes D1 to D10 to a voltage source of minus 6 V. The same terminal of each capacitor is moreover connected to a respective one of two-way C-MOS electronic switches K1 to K10 which are themselves connected to earth. These switches K1 to K10 are controlled by the circuit 23 by means of an auxiliary C-MOS switch K21. The capacitors C1 to C10 are short circuited to earth by the switches K1 to K10, which results in the capacitors being charged to the voltage supplied by the amplifiers 6 (FIG. 2). Once the capacitors are charged, the earthing is interrupted and the signal obtained now downstream of the capacitors is the same as that supplied by the amplifier 6, but reduced by a constant amount which corresponds to the voltage of a photodiode exposed to minimum luminosity. Thus the minimum signal supplied by the photodiodes is converted to a voltage of 0 volts.

The multiplexing of the ten photodiode signals is achieved by means of ten C-MOS switches K11 to K20 controlled successively by the control circuit 23. The outputs of these switches are connected to a common line 25 on which a signal is obtained which is a succession of samples of ten different signals. The photodiodes from which the ten signals are derived are not always the same, but are selected from the total of sixty four photodiodes. This makes possible a displacement in space using the four remaining photodiodes, whereby a displacement of the documents in front of the reading head is compensated by a virtual displacement or shifting of the whole of the sixty photodiodes used. The signals of the four remaining diodes, which in fact do not see any document, are not taken into consideration. The virtual displacement obtained in each of the circuits 8, such as the one shown in FIG. 3, by a network of C-MOS switches K22 to K26 assembled in series and connected to the common line 25. These switches K22 to K26 are also controlled by the control circuit 23. The input of each of these switches is connected respectively to each of the first four multiplexing switches K11, K12, K13 and K14. It is thus possible to take into consideration the signals coming from all or part of the first four switches K11 to K14, that is, the signals proceeding from the first four photodiodes of the group. This corresponds satisfactorily to being able to effect a virtual displacement of the photodiodes, which are of course physically fixed on the reading head, in relation to the document passing in front of the photodiodes. The common line 25 is connected at 26 to the multiplexing network of the adjoinng circuit 8 in such a manner as to be able to reconstitute the group of ten signals with the signals received by the adjoining circuit 8 in order to reconstitute a group of ten signals for multiplexing.

The multiplexed signal on the line 25 is supplied to an operational amplifier A1 having a large input impedance A1. In this manner the analog busbar is not uselessly loaded and the capacitors C1 to C10 which ensure the necessary calibration are not unloaded too rapidly. The amplifier A1 is assembled as a voltage follower. It hence presents a low impedance at its output and the output signal is very little influenced by external electromagnetic influences.

The circuit shown in FIG. 3 processes the first ten photodiodes. It also consists of means which make it possible to obtain a digitalised signal from the first five photodiodes. These means consists basically of five voltage follower operational amplifiers A2 to A6 each supplying a comparator in the form of operational amplifiers A7 to A11 respectively. The amplifiers A2 to A6 receive respectively the signals proceeding from the first five photodiodes taken upsteam of the multiplexing. By means of a potentiometer P1 it is possible to adjust the switching point of the comparators A7 to A11. Hence, at the output of these comparators it is possible to obtain a signal indicating if a document is or is not in front of the photodiode under consideration. These signals D1L, D2L, D3L, D4L, D5L will subsequently be used for the control of the virtual displacement of the sixty photodiode by the command circuit 23.

FIG. 4 partially respresents the circuit 23. The central element of this circuit is a decimal counter CT1 operating to decode 1 signal out of 10. This counter is controlled by a waveform of sixty KHz frequency at its input 27. Each of the ten outputs Q0 to Q9 is hence in the logic state 1 during a period of 20 $\mu$s, which makes a total cycle of 200 $\mu$s. The circuit also includes groups of 5 C-MOS swtiches, of which only the five switches K27, K28, K29, K30 and K31 of the first group are shown in order not to overcrowd the drawing. The switches are connected to respective outputs of the counter CT1. The other terminals of the switches are connected in groups of five by common lines to ten NAND gates G1 to G10, each of these gates controlling a coupling transistor such as T1. The collectors of these transistors are connected to respective ones of ten outputs M1' to M10', which are also shown in FIG. 3, for the control of the analog multiplexing switches. The coupling transistors such as T1 change of working voltage level of 0 volts to +15 volts for the logic and of minus 6 volts to plus 6 volts for the multiplexing network. Each of the said switches K11 to K20 (FIG. 3) will thus allow the passage of the analog signal for a period of 20 $\mu$s once every 200 $\mu$s, thus ensuring the multiplexing of the ten analog signals into one single signal.

The gates NAND G1 to G10 are also controlled by a flip flop FF1 which generates a validation signal which blocks the signal of 20 $\mu$s on switching, that is, on the changeover from one period of 20 $\mu$s to the next. Interference phenomena between the output signals of the counter CT1 are thus avoided by separating them by an interval of 2 $\mu$s. In fact there remains only 18 $\mu$s during which each analog signal is connected.

The circuit 23 also includes means for controlling the virtual displacement of the reading head, that is, the photodiodes. These means consist on the one hand of 50 switches such as K27 to K31 and on the other hand of five flip flops FF2 to FF6. These switches make it possible to select one or the other of the outputs of counter CT1 on the same command of the analog switches K11 to K20. The flip flops FF2 to FF6 each represent a virtual position of the reading head corresponding to the signals C0, C1, C2, C3 and C4 respectively. The flip flops are controlled by a decoding circuit consisting of five AND gates G11, G12, G13, G15 and G16, of three OR gates G14, G19 and G20 and three NOT gates G17, G18 and G21. This circuit decodes the information supplied by the first five photodiodes of the reading head D1L to D5L and for this purpose receives the four signals D1L to D4L. The decoding table is represented in FIG. 4*a*. According to this information the decoding circuit triggers one or another of the flip flops FF2 to F6 which then indicates to the set of switches of FIG. 4 what sequence of the counter CT1 must be supplied to the command of the analog switches K1 to K20 of FIG. 3. For example if the decoding circuit receives the four signals D1L, D2L, D3L and D4L (meaning that the four first diodes are covered) all of the four flip flips FF2 to FF6 are triggered to produce the four signals C1 to C4, and the outputs of the counter CT1 are applied via the switches K27, . . . to the outputs M1 to M10 according to the sequence Q10, Q1 . . . Q9 as shown on the first line of the table. If the decording circuit receives only the signals D2L, D3L, and D4L, the flip flop FF6 is not triggered and the counter CT1 is connected to the outputs M1 to M10 according to the sequence Q9, Q10, Q1 . . . Q8, as shown on the second line of the table, and so on. The shifting of the sequence appearing in the table corresponds to the virtual displacement of the reading head. On the other hand, the signals C0 to C4 of the flip flops FF2 to FF6 are applied to five coupling transistors such as T2, which are identical to the transistor T1, for sending five signals C0′ to C4′ which are used for the control of the switches K22 to K26 of FIG. 3. These signals indicate where the separation of the set of sixty four diodes should take place into six bands of ten photodiodes each for the virtual positioning of the reading head. In summary the order number of scanning of the analog signal under consideration can be displaced which implies a displacement of the photodiode under consideration and thereby a virtual displacement of the reading head.

On earthing of the capacitors C1 to C10 of the analog multiplexing network, a signal CGA blocks the counter CT1 during the loading time. Hence there is no multiplexing during this time. The circuit also includes a transistor T3 by means of which a signal MMC is emitted which controls on the one hand the switch K21 (FIG. 3) for the earthing of the capacitors C1 to C10 and on the other hand the earthing of the amplifier CAG. The signal D5L is not connected to the decoding circuit but is applied simply to a coupling transistor T4 which delivers the signal D5L′. From the decoding circuit of the signals D1L to D4L is taken a signal BHG which indicates that the document to be inspected is coming out of the row of photodiodes. The circuit additionally includes a flip-flop FF7 which indicates the presence of a document to be inspected.

One of the amplifiers CAG and one of the analog/-digital converters, that is to say circuit 9/10 of FIG. 2, are shown in FIG. 5. This circuit receives at 28 the multiplexed analog signal proceeding from the amplifier A1 (FIG. 3). The amplifier CAG includes an operational amplifier A12 preceded by a differential stage formed by two transistors T4 and T5 assembled in the same housing in order to minimise temperature drifts. The variation in gain is obtained by acting on the emitter current of this differential stage by means of a transistor T6. By polarising more or less negatively the base of the transistor T6, the voltage at the terminals is varied by a resistance R1 and thereby the emitter current of the differential stage. The base of the transistor T6 is controlled by the digital signal 29 proceeding from the command circuit 14 through an integrated circuit IC6 and two operational amplifiers A13 and A14.

The output signal of the amplifier A12 is then processed by a voltage follower stage consisting of an operational amplifier A15 to provide a low impedance for driving the analog/digital converter. This A/D converter is an integrated circuit in hybrid technology of the type ADC 540-8. It supplies a word of either bits which is proportional to the input voltage and is sent via output 30 to the circuits 16 and 17 (FIG. 2).

The means used for the automatic correction of the gain of the amplifier CAG include also a differentiator stage A16 which generates the difference between the signal collected at the output of the amplifier CAG, more accurately at the output of the adaptor stage A15, and a reference value taken from a potentiometer P2. This differentiator stage A16 is followed by a circuit formed by an operational amplifier A17 and a transistor T7 which detects the passage through 0 of the difference. Such a passage through 0 means that there is equality between the amplified signal and the reference voltage. A signal will then be supplied to the control circuit 14 (FIG. 6) on a line 31 to indicate that the correction is terminated. By means of two potentiometers P3 and P4 it is possible to assess the constants of the correction circuit, that is, respectively on the one hand the working point of the correction circuit, on the other hand the total range over which this circuit operates. These two signals are added by means of the circuit A14 to produce the signal which is applied to the base of the transistors T6.

The command circuit of the amplifier CAG is represented in FIG. 6. This command circuit is formed mainly of an eight bit binary counter made up from two interconnected four bit counters CT2, CT3. The digital signals for correction of the gain 29 proceeding from the circuit according to FIG. 5 are applied to the counter CT2. The command circuit also includes a network of exclusive—OR gates G22, G23, G24 and G25 to which is applied the signal 31 indicating the change of polarity of the differentiator A16 (FIG. 5), a flip flop FF8, and a set of switches CM1, CM2, CM3 and CM4. Depending on whether or not the correction voltage must be increased or decreased, the counter CT2/CT3 counts up or down until the digital value corresponding to the output correction voltage is obtained. At this moment a pulse proceeding from the network of exclusive—OR gates actuates the flip flop FF8 which stops the counting by its output Q through two NAND gates G26 and G27. The flip flop FF8 is reset to zero by the counter CT3 through a NAND gate G28. The output $\overline{Q}$ of the flip flop FF8 is, moreover, sent through an adaptation transistor T8, through a line 32 to the multiplexing circuit (FIG. 3).

FIG. 7 represents the multiplexing circuit 1/6 and comparison circuit 17 of FIG. 2. This circuit includes a multiplexing network formed of eight multiplexing elements M1, M2, M3, M5, M6, M7 and M8 receiving at 33 the command signal of the time base 22. Each of the circuits M1 to M8 receives the digital signals of the six circuits 10, the circuit M1 receiving the first bit, the circuit M2 the second bit and so on. The FIGS. 6, 1, 2, 3, 4, 5, appearing under the word "bit" indicate the origin of the signal. The multiplexing network brings successively each of the six digital words of eight bits by eight lines 34 to the terminals of five comparators CP1, CP2, CP3, CP4 and CP5, connected in parallel, in a period of 20 μs which is the period between changes of the digital words. The comparators additionally receive on lines 35, 36, 37, 38 and 39 reference values proceeding from the microprocessor system MP2 (FIG. 2) in the form of a word of eight bits. The reference values can vary according to the place of the document which is inspected, as a function of the programme of the microprocessor system.

The functions of the comparators C1 to C5 are, respectively, as follows: detection of the presence of a document in front of the photodiode under consideration; detection of paper adhering on the document; detection of dark stains on the document; detection of holes in the edges of the document; detection of holes on the document. The results of the comparison are sent via outputs 40 to 44 to circuits 18 and 19 where they are accounted for, the result being subsequently sent to the microprocessor systems MP1 and MP3 (FIG. 2). In view of the fact that only the dark stains appearing on the document must be detected, the signal proceeding from the comparator CP3 must only be taken into consideration if the comparator CP1 delivers a signal indicating that the document is situated in front of the photodiode under consideration. For this purpose the two signals are applied to an AND gate G29.

The circuit 18 which inspects the dimensions of the document and for adhering paper is likewise achieved by means of commercial integrated circuits, according to a conventional technique. Hence this circuit is not reproduced here in detail. This circuit includes a first flip flop system FF9 (FIG. 8) which receives the signal 40 of the comparator CP1 and which delivers a signal indicating the presence of a document in front of the reading head. The logic state "1" indicates that the document is present, while the logic state "0" indicates that the document is absent. These signals are used by several circuits as well as by the microprocessors, especially to deduce the length of the document which is being inspected.

The signal 40 "limit of paper" is likewise sent to a system of counters CT4 which counts the number of photodiodes of the collector which are covered by the document during a measuring column. This number directly reflects the information "width of the document." At the end of each column, the total is stored in the registers REG1 where the microprocessor system MP3 will come to read it, in order to process it later. In the same manner, another system of counters CT5 receives the signal 41 "adhering paper" and totals the number of points of which the signal is high, which implies a considerable reflection. Each of these totals is likewise sent into registers REG2 where they are likewise loaded and processed by the microprocessor system MP3.

A pair of flip flops FF10 is responsive for storing the information supplied by the microprocessor system MP2 concerning the special zones of the document which is useful to take especially into consideration. The flip flops FF10 transmit this information to the recording device REG2 for its transmission to the microprocessor MP3 which processes it with the information concerning the adhering paper.

The circuit also includes a second pair of flip flops FF11 which receives on the one hand the "document signal" of the flip flop FF9 and on the other hand the multiplexing and synchronisation signals for delivering two signals, that is a signal 45 "change of column" and a signal 46, "change of limit" which indicates to the microprocessor each scanning cycle of 200 μs. These signals 45 and 46 guarantee the devision of the document into columns of a width of about 1 mm.

The circuit 19 which is responsible for counting the stains and holes in the document is likewise represented in a diagrammatic manner in FIG. 9. This circuit includes three groups of counters CT6, CT7 and CT8 which are responsible respectively for totalling the information supplied respectively by the comparators CT3, CT4 and CT5. For this purpose, the counters CT6, CT7 and CT8 respectively receive the signals 42, 43 and 44 concerning respectively the following criteria: dark stains; holes on the edges of the document (transparent stains); and holes on the rest of the document. These counters receive a counting pulse per photodiode which increments the counter according to the condition of the output of the corresponding comparator. When the document is entirely inspected the microprocessor MP1 comes to read in succession the three totals at the terminals of the counters and processes them in order to draw from them a conclusion as to the quality of the document. The outputs of the three counters are connected to the microprocessors MP1 by a bus of eight bits and by means of high impedance circuits which make it possible for the three items of information to use the same lines. The successive sending of information of three groups of counters is achieved by means of groups of C-MOS switches M9, M10 and M11, as for the analog multiplexing.

This circuit includes, moreover, a validation circuit V, formed of logic elements, whose purpose is to make possible the totalling of the points of the document, as described above, in a different manner depending on the size of the document. In fact, according to the size of the documents, the place of the zones to be inspected, like the holes in the edges, for example, can vary. This validation circuit makes it possible to take into account this variation to a certain extent. For this purpose it receives notably the signals m1 to m10 proceeding from the command circuit of analog multiplexing and virtual positioning of the reading head (FIG. 4) indicating the diodes to be taken into consideration, as well as a signal 47 indicating the size of the document and the zones to be taken into consideration on the documents as far as the detection of dark stains and holes is concerned.

The state of general dirtiness of the document is determined by means of the similar averaging circuits 16. These circuits are simply logic adders and have not been shown. They carry out totalling of the words of eight bits representing the measurement carried out by each of the photodiodes and hence representing the surface state of the point of a document. On making the total of all these points, information is obtained concerning the state of dirtiness of the whole of a surface which it is hence sufficient to compare with a reference value in order to decide whether the document is or is not acceptable. Each circuit consists of five logic adders of four bits respectively associated with five registers which make it possible to obtain a maximum word of twenty bits. Of these twenty bits only the fifteen most significant bits are considered for the digital processing which will follow. When a total is terminated, these most significant fifteen bits are committed to memory in the registers and the adder is reset to zero and can immediately start again a new sum. The circuits 16 are commanded by the microprocessor systems MP1 and MP2 by means of the circuit 24 which serves as an interface between the microprocessors and the circuits 16. In view of the fact that the microprocessors operate in an asynchronous manner with the rest of the logic, this circuit 24 is responsible for re-establishing the signals with the necessary phase. For this purpose this receives the command signals of the time base 2. By means of the circuit 24 the microprocessors indicate to the circuits 16 that the sum is terminated. From this instant the registers which have stored the fifteen most significant bits can be read by the microprocessors MP1.

The reading head is represented by FIGS. 10 and 11. This head is assembled vertically. It is mechanically protected by the support formed by the cross piece 50 and the support 51. The fixing is ensured by means of a screw 52 crossing a cross piece 53 made from insulating material presenting an oblong hole making it possible to adjust the distance from the head to the document to be inspected. The lower part of the head rests on the housing 4. The head includes the housing 55 which consists of assembled plates. This housing carries a massive prismatic component 56 pierced with sixth four holes 57 crossing the component 56 from either side. The photodiodes are placed in the right hand end, in the drawing, of the holes 57. On the outside the holes are covered by a dust cover 58 made from transparent synthetic material. On the support 56 is fixed an angle bracket 59 carrying a printed circuit 60 on which are welded the connections of the head photodiodes 46 and the sockets 61 for the plugs 62 connected to cables 63 connecting the photodiodes to the head amplifier 6. The optical fibres are connected in a circular cluster held in an envelope 64 connected to the light source. In the part 65 of the head these optical fibres are spread out in such a manner as to present a linear front along a generatrix 66 of a reflector 67 formed by a cylindrical bar made from optical glass. The cluster of optical fibres is hence used as a section converter. The reflector 67 is fixed by means of a cover 68. The assembly is hermetically sealed by sealing arrangements 69, 70 and 71. The document to be inspected is moved in front of the head according to the direction 72 and is struck by light beam 73 coming from the reflector 67.

What is claimed is:

1. A process for inspecting the physical state of a printed document wherein the document is caused to pass in front of a source of light and the light reflected is collected by means of photoelectric elements and compared with a reference value, characterised in that the document to be inspected is made to pass laterally with respect to a row of photoelectric elements, the signals delivered simultaneously by the row of photoelectric elements are successively transmitted by multiplexing, the analog signals delivered by the photoelectric elements are converted into digital signals, the digital signals are averaged in order to determine the general state of dirtiness of the document, the number of photoelectric elements of the row which are covered by the document are counted in order to determine the width of the document and to detect the presence of dog ears, the number of photoelectric elements delivering a signal which exceeds a certain level are counted to detect abnormal reflections, and each digital signal corresponding to a point of the document is compared with a reference value in order to determine the presence of a hole, a stain or a similar condition.

2. An installation for putting the process according to claim 1 into operation, characterised by a source of cold white light, a reading head consisting of a number n of photoelectric elements forming a row of length greater than the width of the widest document to be inspected, the number of elements being divided into several equal groups, an amplifier in respect of each of the photoelectric elements, a first multiplexing circuit associated with each group, an amplifier with automatic gain correction and an analog/digital converter associated with each multiplexing circuit, a circuit for counting and averaging in respect of each analog/digital converter, a second multiplexing circuit receiving simultaneously the signals of all the analog/digital converters, a circuit for counting the digital signals proceeding from all the photoelectric elements, a circuit for comparison of the digital signals corresponding to each photoelectric element with a reference value including several comparators, a circuit for counting the signals delivered by the comparators which are outside desired tolerances, and a clock circuit controlled by a signal of frequency synchronous with the speed at which the documents to be inspected pass through.

3. An installation according to claim 2, characterised by means for selecting the photoelectric elements whose signal must be taken into consideration among n photoelectric elements as a function of the position of the document to be inspected relative to the ends of the row of photoelectric elements, and means for carrying out, if necessary, a virtual displacement of the reading head corresponding to the actual displacement of the document relative to the ends of the row.

4. An installation according to claim 2, characterised by means for calibrating the signals coming from the amplifiers, the calibrating means consisting of a capacitive coupling and switches connected respectively to one of the terminals of each coupling capacitor for periodically charging the coupling capacitors.

5. An installation according to claim 2, characterised by the first multiplexing circuit consisting of multiplexing switches switched successively by a counter which consists of as many outputs as there are photoelectric elements in a group, and the means for carrying out the virtual displacement of the reading head including comparators to which are applied respectively the amplified and digitalised signals proceeding from a predetermined number of photoelectric elements from one end of the row, a control circuit being provided to which are applied the signals proceeding from the said comparators, and switches being provided commanded by the said command circuit and connecting one or the other of the outputs of the said counter to the same command of the multiplexing switches.

* * * * *